(12) United States Patent
Chiou et al.

(10) Patent No.: US 7,044,802 B2
(45) Date of Patent: May 16, 2006

(54) USB FLASH-MEMORY CARD WITH PERIMETER FRAME AND COVERS THAT ALLOW MOUNTING OF CHIPS ON BOTH SIDES OF A PCB

(75) Inventors: Ren-Kang Chiou, Fremont, CA (US); Jim Chin-Nan Ni, San Jose, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 10/905,311

(22) Filed: Dec. 27, 2004

(65) Prior Publication Data

US 2005/0085129 A1      Apr. 21, 2005

Related U.S. Application Data

(63) Continuation-in-part of application No. 10/904,207, filed on Oct. 28, 2004, and a continuation-in-part of application No. 10/605,146, filed on Sep. 11, 2003, now Pat. No. 6,854,984.

(51) Int. Cl.
*H01R 24/00* (2006.01)
(52) U.S. Cl. ...................................... 439/660; 439/638
(58) Field of Classification Search ................ 439/660, 439/638, 630, 607, 609, 108, 76.1, 541.5, 439/17; 710/74
See application file for complete search history.

(56) References Cited

U.S. PATENT DOCUMENTS

| | | | |
|---|---|---|---|
| 6,567,273 B1 | 5/2003 | Liu et al. | 361/737 |
| 6,676,419 B1 | 1/2004 | Lin et al. | 439/76.1 |
| 6,676,420 B1 | 1/2004 | Liu et al. | 439/131 |
| 6,733,329 B1 | 5/2004 | Yang | 439/518 |
| 6,733,332 B1 | 5/2004 | Espenshade et al. | 439/541.5 |
| 6,763,410 B1 | 7/2004 | Yu | 710/74 |
| 6,792,487 B1 | 9/2004 | Kao | 710/74 |
| 2003/0100203 A1 | 5/2003 | Yen | 439/79 |
| 2004/0002264 A1* | 1/2004 | Yao | 439/638 |
| 2004/0087216 A1 | 5/2004 | Kao | 439/638 |
| 2004/0175976 A1 | 9/2004 | Park | 439/176 |

* cited by examiner

*Primary Examiner*—Alexander Gilman
(74) *Attorney, Agent, or Firm*—Stuart T. Auvinen

(57) ABSTRACT

A flash-memory-drive card has a Universal-Serial-Bus (USB) connector. The card has a printed-circuit board (PCB) that fits into a perimeter frame that surrounds the edges of the PCB. Metal or plastic upper and lower covers are snapped onto the frame to encapsulate the PCB. The USB connector can be a Full USB connector plug that extends from the perimeter frame and has a centerline approximately matching the PCB centerline for a balanced design, or can be a slim or reduced-height USB connector plug that has a frame closure bar that fits inside closure fittings on the perimeter frame. The USB connector can also be made from a frame extension that has four frame slots through the frame. The PCB has four PCB fingers that are inserted through the frame slots during assembly so that the PCB fingers fit within depressions in the frame extension to form the USB connector plug.

19 Claims, 15 Drawing Sheets

USB FLASH-MEMORY CARD WITH PERIMETER FRAME AND COVERS THAT ALLOW MOUNTING OF CHIPS ON BOTH SIDES OF A PCB

RELATED APPLICATIONS

This application is a continuation-in-part of the co-pending application for "Slim USB Connector with Spring-Engaging Depressions, Stabilizing Dividers and Wider End Rails for Flash-Memory Drive", U.S. Ser. No. 10/605,146, filed Sep. 19, 2003, now U.S. Pat. No. 6,854,984 and "Manufacturing Methods for Ultra-Slim USB Flash Memory Card with Supporting Dividers or Underside Ribs", U.S. Ser. No. 10/904,207, filed Oct. 28, 2004.

FIELD OF THE INVENTION

This invention relates to flash-memory-drive cards, and more particularly to frame-based manufacturing methods for cards with reduced-height Universal-Serial-Bus (USB) connectors.

BACKGROUND OF THE INVENTION

Flash-memory technologies such as those using electrically-erasable programmable read-only memory (EE-PROM) have produced chips storing 1 G-Bytes or more. Small flash-memory cards have been designed that have a connector that can plug into a specialized reader, such as for compact-flash, secure-digital, memory stick, or other standardized formats.

More recently, flash memory cards are being sold that contain a USB connector. Such USB-flash memory cards do not require a specialized reader but can be plugged into a USB connector on a personal computer (PC) or other hosting device. These USB-flash memory cards can be used in place of floppy disks. A USB-flash card can have a capacity of more than ten floppy disks in an area not much larger than a large postage stamp.

FIG. 1A shows a prior-art flash-memory card with a USB connector. Flash memory chip 12 may be a 128 Mega-byte non-volatile chip or may have some other capacity. Controller chip 14 contains a flash-memory controller that generates signals to access memory locations within flash memory chip 12. Controller chip 14 also contains a USB interface controller that serially transfers data to and from flash memory chip 12 over a USB connection.

USB connector 20 may be mounted on board 10, which is a small circuit board with chips 12, 14 mounted thereon. Multi-layer printed-circuit board (PCB) technology can be used for board 10. A plastic case (not shown) can surround board 10.

USB connector 20 contains a small connector substrate 16, which is often white ceramic, black rigid plastic, or another sturdy substrate. Connector substrate 16 has four or more metal contacts 18 formed thereon. Metal contacts 18 carry the USB signals generated or received by controller chip 14. USB signals include power, ground, and serial differential data D+, D–.

USB connector 20 contains a metal case that wraps around connector substrate 16. The metal case touches connector substrate 16 on three of the sides of connector substrate 16. The top side of connector substrate 16, holding metal contacts 18, has a large gap to the top of the metal case. On the top and bottom of this metal wrap are formed holes 15. USB connector 20 is a male connector, such as a type-A USB connector.

FIG. 1B shows a female USB connector. Female USB connector 22 can be an integral part of a PC, or can be connected by cable 21. Another connector substrate 26 contains four metal contacts 28 that make electrical contact with the four metal contacts 18 of the male USB connector 20 of FIG. 1A. Connector substrate 26 is wrapped by a metal case, but small gaps are between the metal case and connector substrate 26 on the lower three sides.

Locking is provided by metal springs 24 in the top and bottom of the metal case. When male USB connector 20 of FIG. 1A is flipped over and inserted into Female USB connector 22 of FIG. 1B, metal springs 24 lock into holes 15 of male USB connector 20.

FIGS. 2A, 2B are cross-sections highlighting connections between male and female USB connectors. Female USB connector 22 is on the left while male USB connector 20 is being inserted from the right. Male USB connector 20 is flipped over relative to the view of FIG. 1A. Metal contacts 18 are formed on the lower surface of connector substrate 16 on male USB connector 20, while metal contacts 28 are formed on the upper surface of connector substrate 26 on Female USB connector 22. Thus the metal contacts face one another to allow for electrical contact when male USB connector 20 is inserted into Female USB connector 22 as shown in FIG. 2B.

Metal springs 24 formed on the metal case surrounding connector substrate 26 on Female USB connector 22 fit into holes on the metal case of male USB connector 20. This helps to lock the connectors together.

FIG. 3 shows a prior-art USB flash memory card using a slim USB connector. Male USB connector 20 of FIGS. 1, 2 is relatively large. The metal case in particular is cumbersome and increases manufacturing cost. Costs may be reduced by integrating male USB connector 30 with board 32. Board 32 is a PCB that has flash memory chip 12 and controller chip 14 mounted thereon. Board 32 is extended to include male USB connector 30, which has metal contacts 38 formed on end 36 of board 32.

The width and thickness of board 32 at end 36 containing male USB connector 30 is designed to approximately match that of connector substrate 16 of FIG. 1A. Plastic case 34 can enclose board 32 but have an opening for metal contacts 38. Plastic case 34 can cover the bottom and sides of male USB connector 30 up to end 36 to emulate potions of the metal case of the male USB connector of FIG. 1A.

FIGS. 4A, 4B show cross-sections of the prior-art slim USB connector being inserted into a standard Female USB connector. Board 32 that has male USB connector 30 formed on end 36 is flipped over from the view shown in FIG. 3, and end 36 is inserted into female USB connector 22 from the right side.

Metal contacts 38 are located on the lower surface of male USB connector 30. Plastic case 34 has an opening on the lower surface of male USB connector 30 to expose the metal contacts so they can make electrical connection with metal contacts 28 on the upper surface of connector substrate 26 of Female USB connector 22 when inserted as shown in FIG. 4B.

Plastic case 34 helps to fill the gate between board 32 and the top edge of the metal case of Female USB connector 22. Plastic case 34 is also formed along the thin edges of board 32 and helps to fill in the gaps between connector substrate 26 and the sides of the metal case of Female USB connector 22 that are above and below the plane of FIG. 4B.

While slim USB connector 30 can be less expensive and smaller than the standard USB connector, it fits less securely into a standard Female USB connector. The lack of the metal case removes the mechanical support provided as the male metal case that fit in the gap below connector substrate 26 and the bottom side of the metal case for the female connector. The result is a noticeable wobble in the up and down direction when a USB flash memory card containing male USB connector 30 is inserted into Female USB connector 22. Vertical movement of 3–4 millimeter at the end of a 4-centimeter flash card can occur with slight finger pressure. This vertical play gives the user the feeling that the flash memory card is cheap and unreliable, even when sufficient electrical contact is made.

Parent Patent Uses Dividers and End Rails to Aid Support

The parent patent, U.S. Ser. No. 10/605,146, now U.S. Pat. No. 6,854,984 disclosed using dividers between the metal USB pads and end rails to increase support for a slim USB connector. A flash-memory card using such as supporting slim USB connector was also disclosed in the parent patent.

While useful, various improvements in the flash-memory card with the slim USB connector have been developed by the inventors. Manufacturing methods and products made by these methods are also being disclosed in this application.

DETAILED DESCRIPTION

The present invention relates to an improvement in flash-memory devices with slim USB connectors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have discovered that a variety of manufacturing methods may be used to make the flash-memory card with supporting dividers between the USB metal pads. In particular, a perimeter frame that surrounds the printed-circuit board (PCB) can increase strength of the device. Such perimeter frames are used for Compact-Flash cards, but not typically used for USB drives. Metal covers one both sides of the open frame can snap securely into the frame, increasing strength. The two metal covers can be different or can be identical, reducing manufacturing costs.

The frame may allow for IC chips and other components to be mounted on both sides of the PCB. In slimmer embodiments, the IC's may be mounted on the side of the board that is opposite to the 4 USB metal pads. This can allow for a thinner flash-memory drive card. The side with the 4 USB pads can be flatter when no IC chips are mounted on this side, allowing for a flatter USB drive package. Having IC chips on the same side could require that the USB drive package protrude upward to cover the IC chips.

In addition, a portion of the plastic case may have a reduced thickness. A light-emitting diode (LED) or light pipe may be placed near this reduced-thickness area of the plastic case, allowing the user to see an indicator light mounted to the circuit board. The indicator light can turn on or blink when the memory is being accessed or written, and various patterns or sequences could be used to indicate the different operations (constant on for reading, rapid blinks for writing, long blinks for errors, etc.)

Figure 1A:
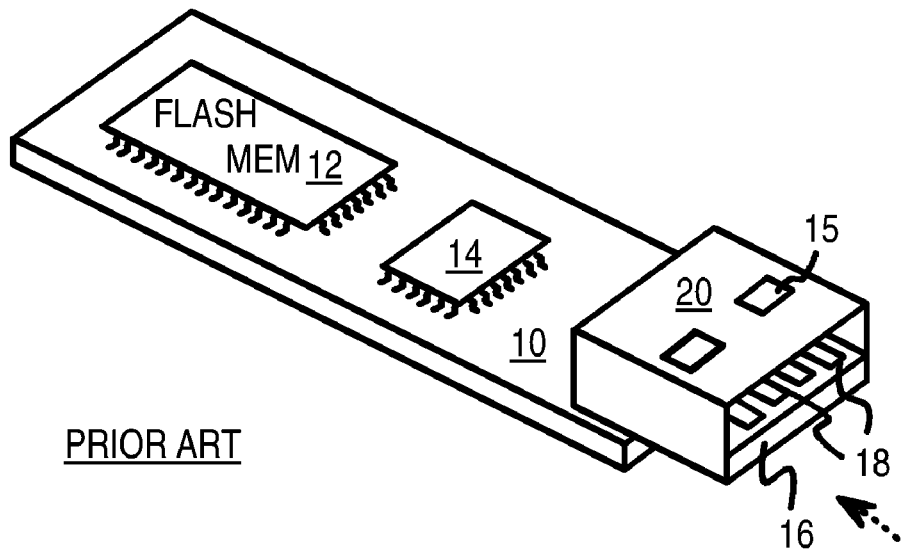
FIG. 1A shows a prior-art flash-memory card with a USB connector.
Figure 1B:
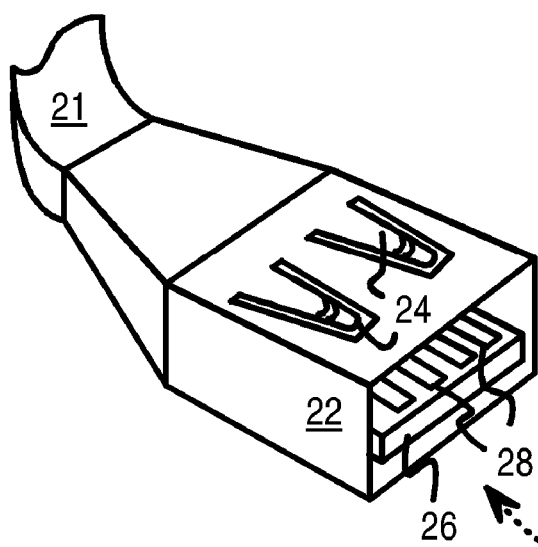
FIG. 1B shows a female USB connector.
Figure 2A:
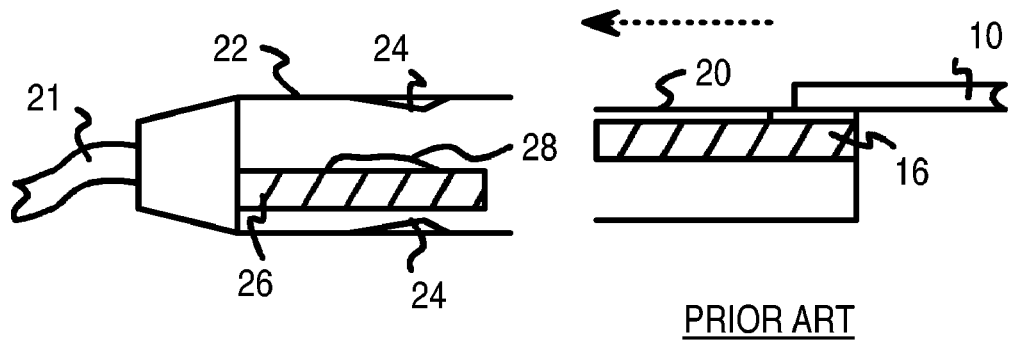
FIGS. 2A, 2B are cross-sections highlighting connections between male and female USB connectors.
Figure 2B:
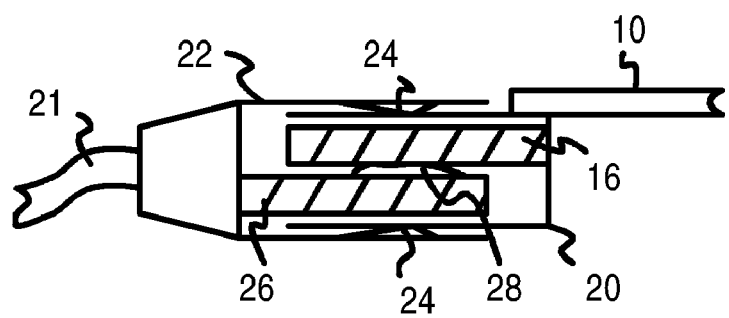
Figure 3:
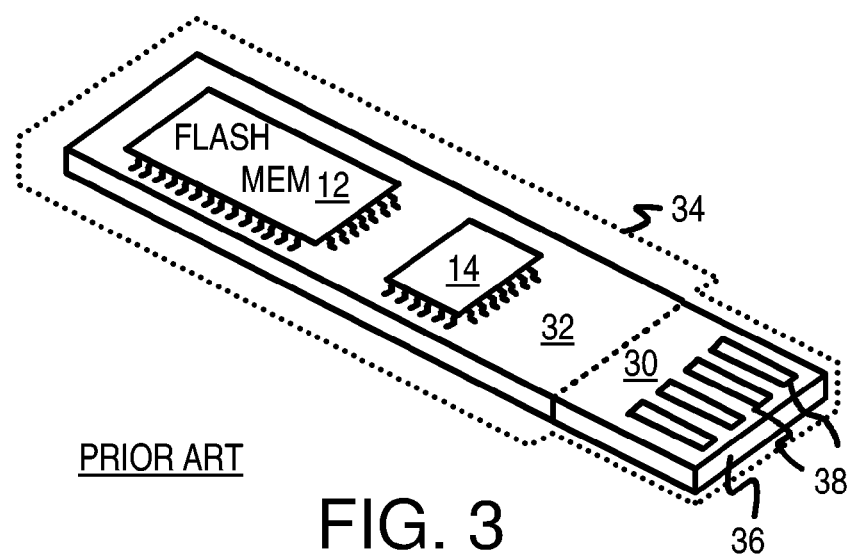
FIG. 3 shows a prior-art USB flash memory card using a slim USB connector.
Figure 4A:
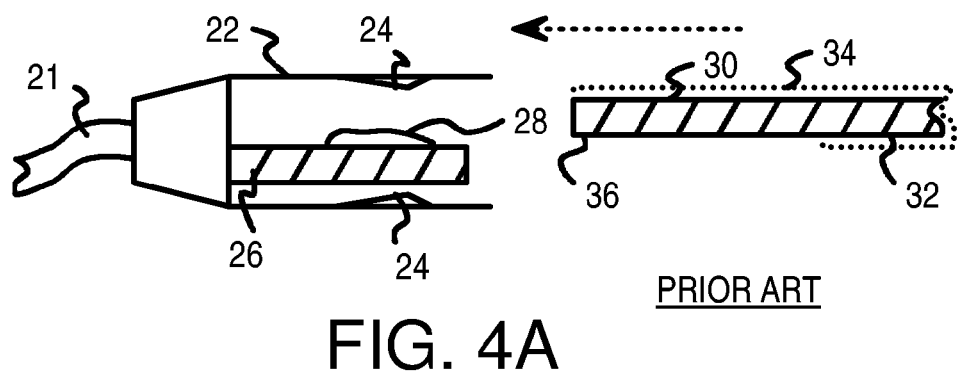
FIGS. 4A, 4B show cross-sections of the prior-art slim USB connector being inserted into a standard Female USB connector.
Figure 4B:
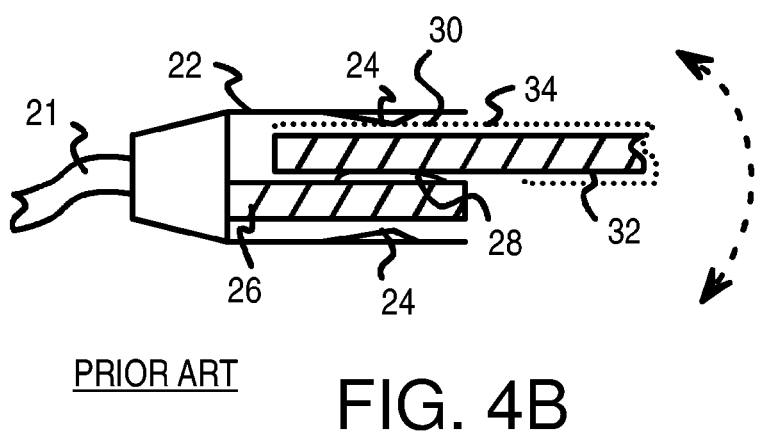
Figure 5A:
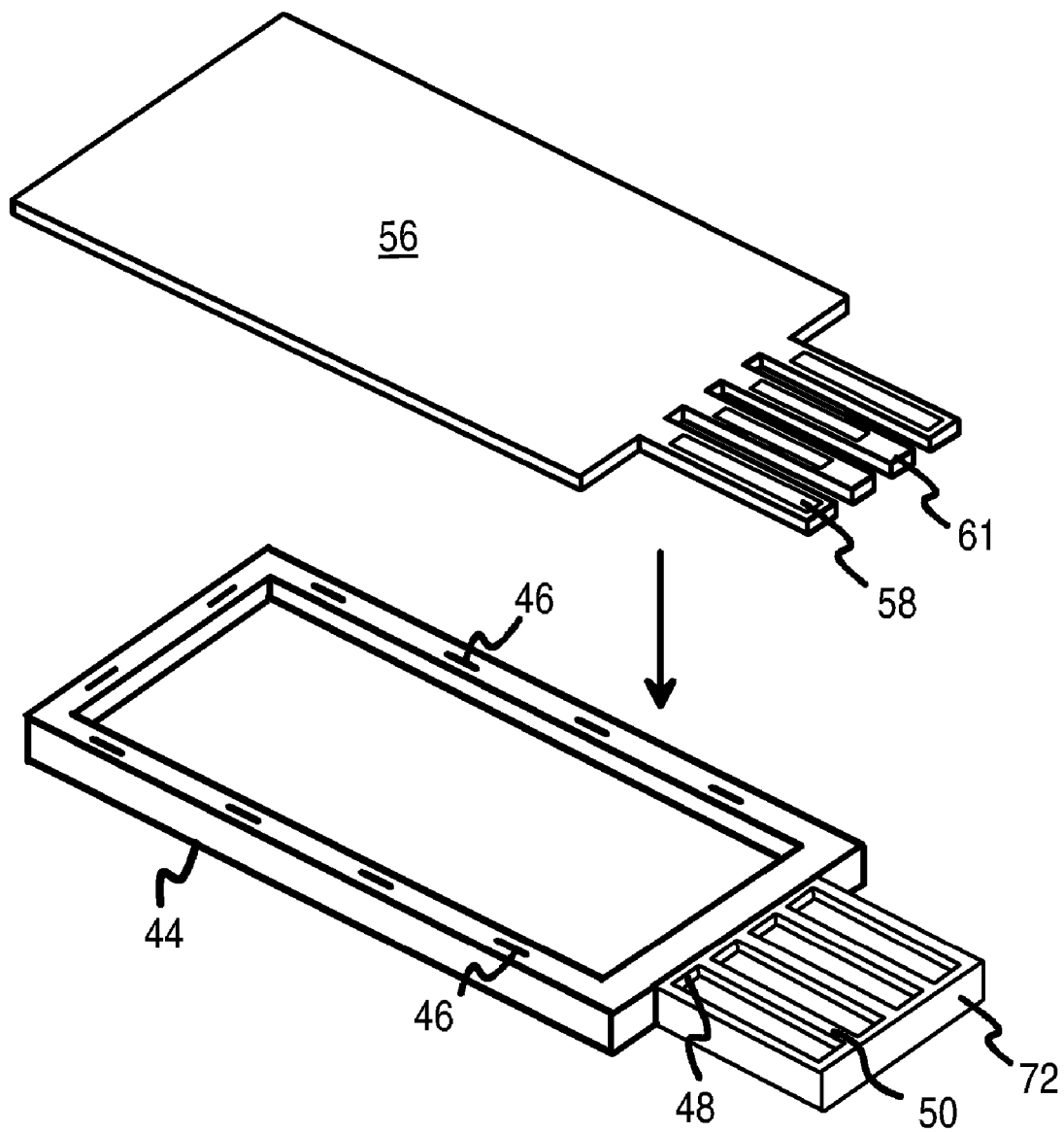
FIGS. 5A–D show assembly of a flash-memory-drive card with a perimeter frame surrounding the PCB.
Figure 5B:
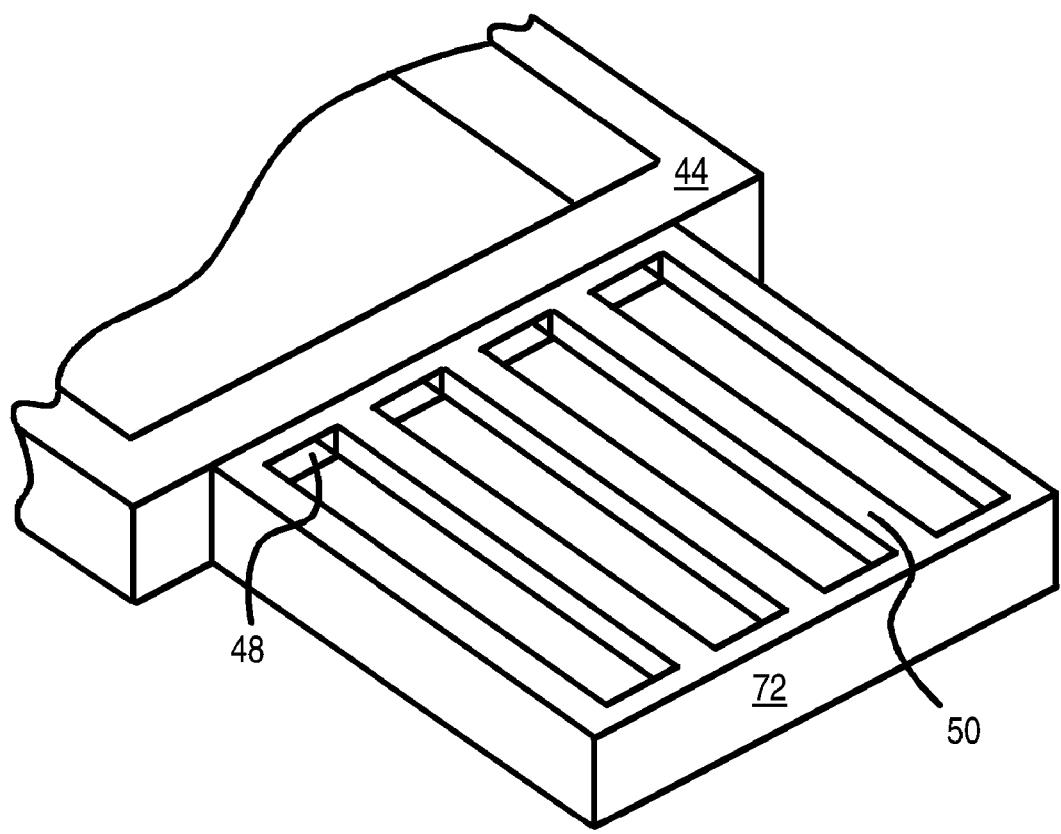
Figure 5C:
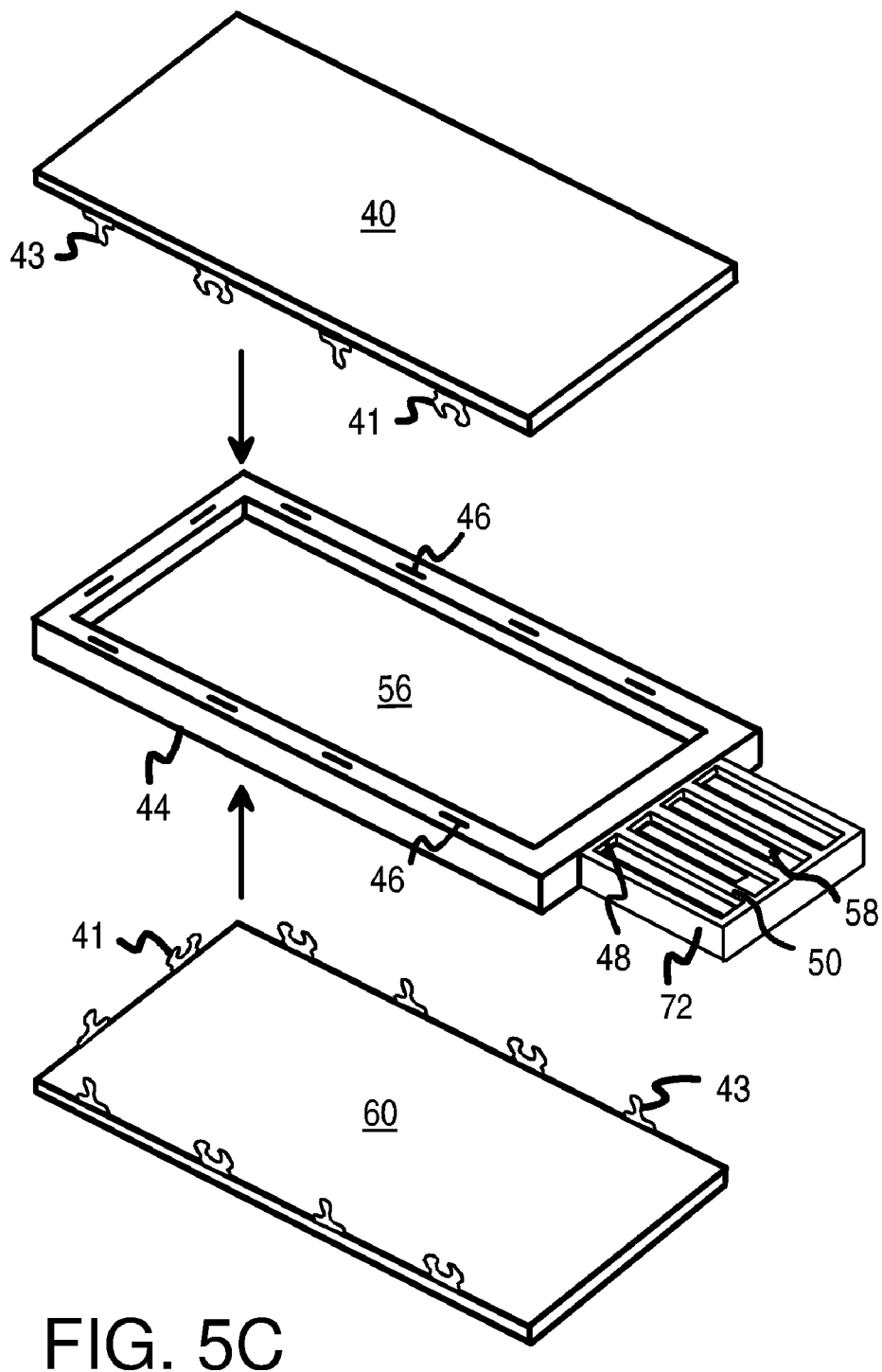
Figure 5D:
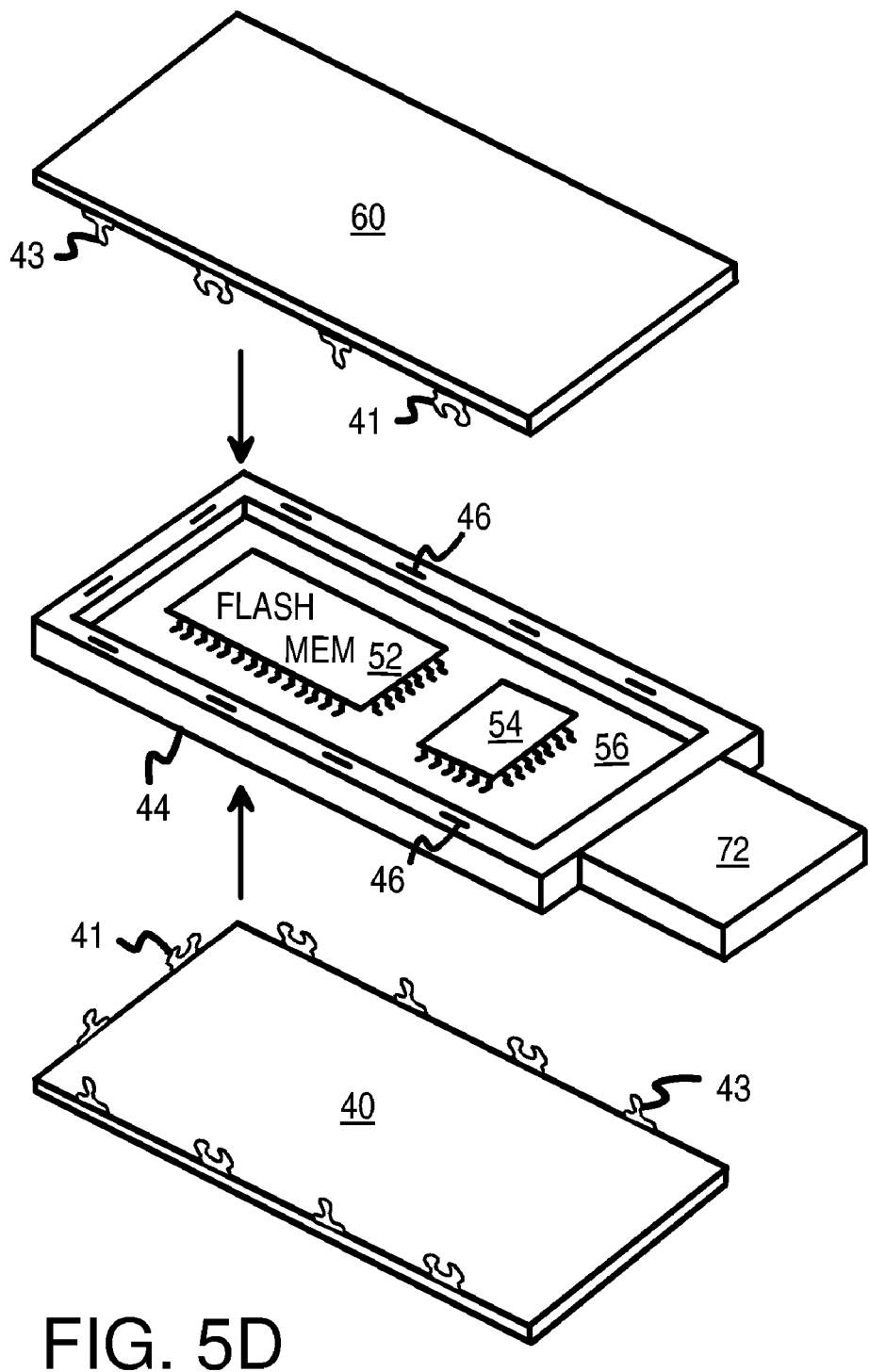

FIGS. 5A–D show assembly of a flash-memory-drive card with a perimeter frame surrounding the PCB. The top or upper side of the PCB may be considered to be the side having the 4 USB metal pads facing upward, while the bottom side is the side without the USB metal pads. FIGS. 5A–C show a top view, where USB metal contacts 58 are visible, while FIG. 5D shows a bottom view where metal contacts 58 are hidden from view.

The USB flash-memory card is assembled from perimeter frame 44, which surrounds board 56 and its mounted components. The open top and bottom of perimeter frame 44 are covered by upper cover 40 and lower cover 60, which can be identical metal or plastic covers.

In FIG. 5A, board 56 has chips mounted on the reverse side (not visible in this top view). Four metal contacts 58 are formed on the top of board 56 on four PCB fingers 61 that extend from board 56. Three gaps may be cut in board 56 between pairs of metal contacts 58 to form PCB fingers 61. The four metal contacts 58 form the four USB metal contacts for an integral USB connector plug.

Perimeter frame 44 can be made from metal or rigid plastic, and is open in the middle. Perimeter frame 44 has a square ring shape with an opening in the middle of the perimeter ring. Along one side of perimeter frame 44 is formed frame extension 72. Frame extension 72 has the shape of a USB connector plug and has four depressions between dividers 50 and the ends of frame extension 72. These four depressions are sized to contain the four PCB fingers 61 of board 56 when board 56 is fitted into perimeter frame 44.

Perimeter frame 44 has four frame slots 48 on the side where frame extension 72 joins perimeter frame 44. These frame slots 48 are large enough to allow PCB fingers 61 to pass through during assembly. The tips of PCB fingers 61 are placed into frame slots 48 from the inside opening of perimeter frame 44. and PCB fingers 61 are pushed through frame slots 48 into the depressions on frame extension 72. Once PCB fingers 61 are fitted into frame slots 48, board 56 can be snapped down into the opening of perimeter frame 44. Grooves (not shown) on the inside edges of perimeter frame 44 can be provided to fit with the outside perimeter of board 56.

FIG. 5B is a close up of frame extension 72. Before PCB fingers 61 are inserted into frame slots 48 from the inside opening of perimeter frame 44, frame slots 48 are empty.

Dividers 50 are formed between depressions that extend from frame slots 48 in frame extension 72. These depressions contain PCB fingers 61 when inserted fully through frame slots 48. Ridges or grooves on the sides of the depressions or in frame slots 48 to better fit PCB fingers 61 may be provided in frame extension 72, but are not shown.

FIG. 5C shows board 56 fitted into perimeter frame 44. PCB fingers 61 of board 56 have been fitted through frame slots 48 in perimeter frame 44. Metal contacts 58 on PCB fingers 61 are exposed and visible through the depressions in frame extension 72, between dividers 50.

Upper cover 40 can be snapped onto the top of perimeter frame 44, and lower cover 60 can be snapped onto the bottom of perimeter frame 44. Snaps such as male snap 43 or female snap 41 can be formed along the perimeter of upper cover 40 and lower cover 60, and fit into snap slots 46 on perimeter frame 44. A variety of kinds of snaps may be used.

The height of the assembled USB drive can be approximately 2.2 mm, compared to prior-art USB drives which have heights of as much as 8.0 mm. If a thicker USB device with a thicker perimeter frame 44 was desired, IC chips could be mounted on both sides of board 56.

FIG. 5D shows the bottom view. IC chips, such as flash memory chip 52 and controller chip 54 are mounted on the reverse (bottom) side of board 56, which can be a multi-layer PCB or similar substrate with wiring traces. IC chips 52, 54 are pre-mounted to the bottom side of board 56, which is fit into perimeter frame 44.

Figure 6A:
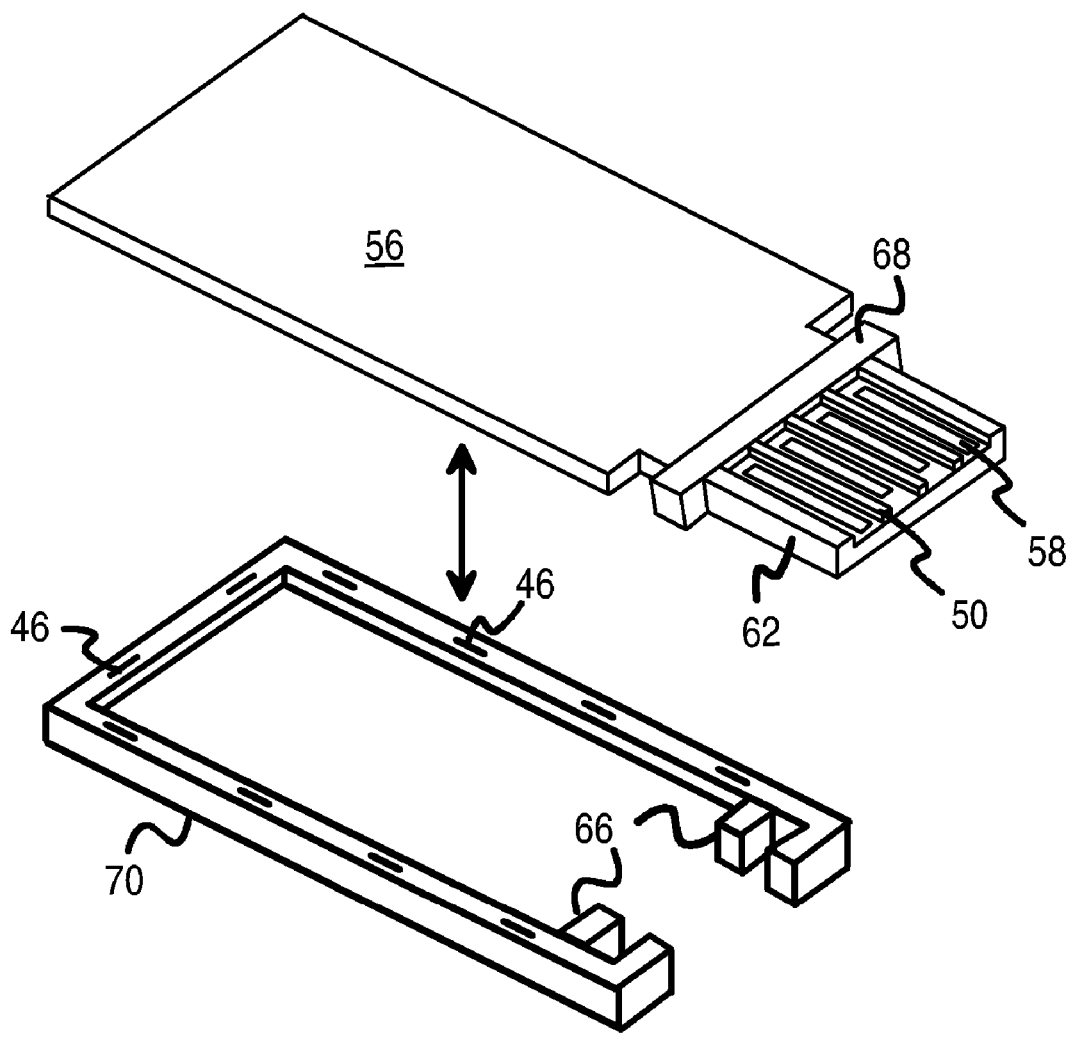
FIGS. 6A–C show assembly of a USB flash-memory drive with a USB connector attached to the PCB before assembly to a C-shaped frame.
Figure 6B:
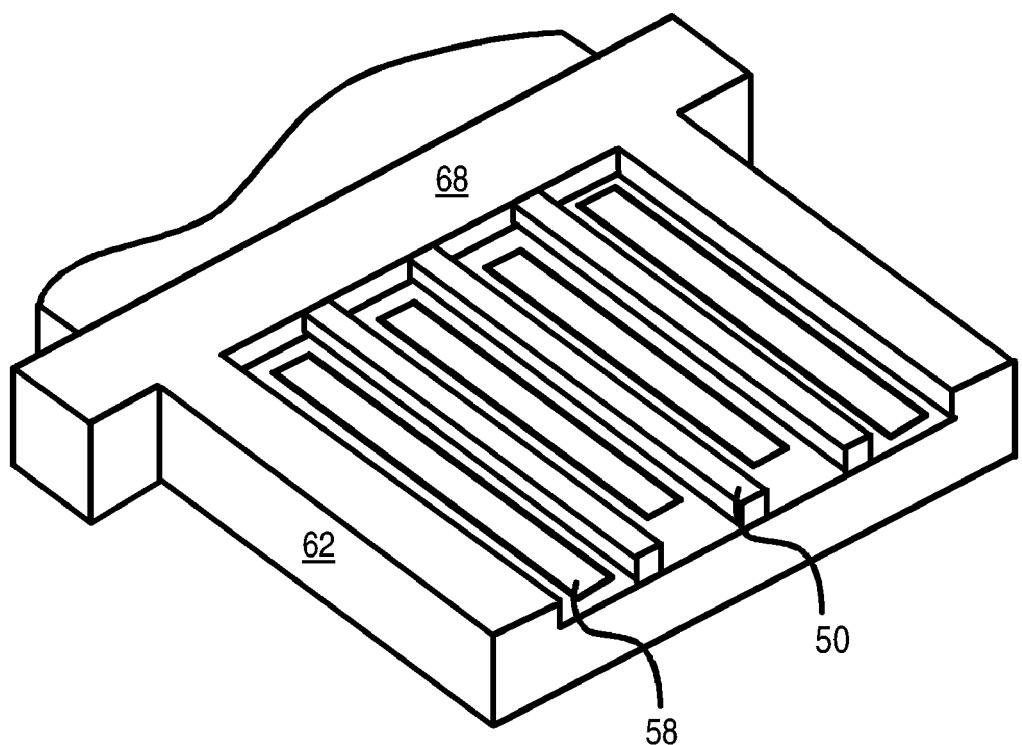
Figure 6C:
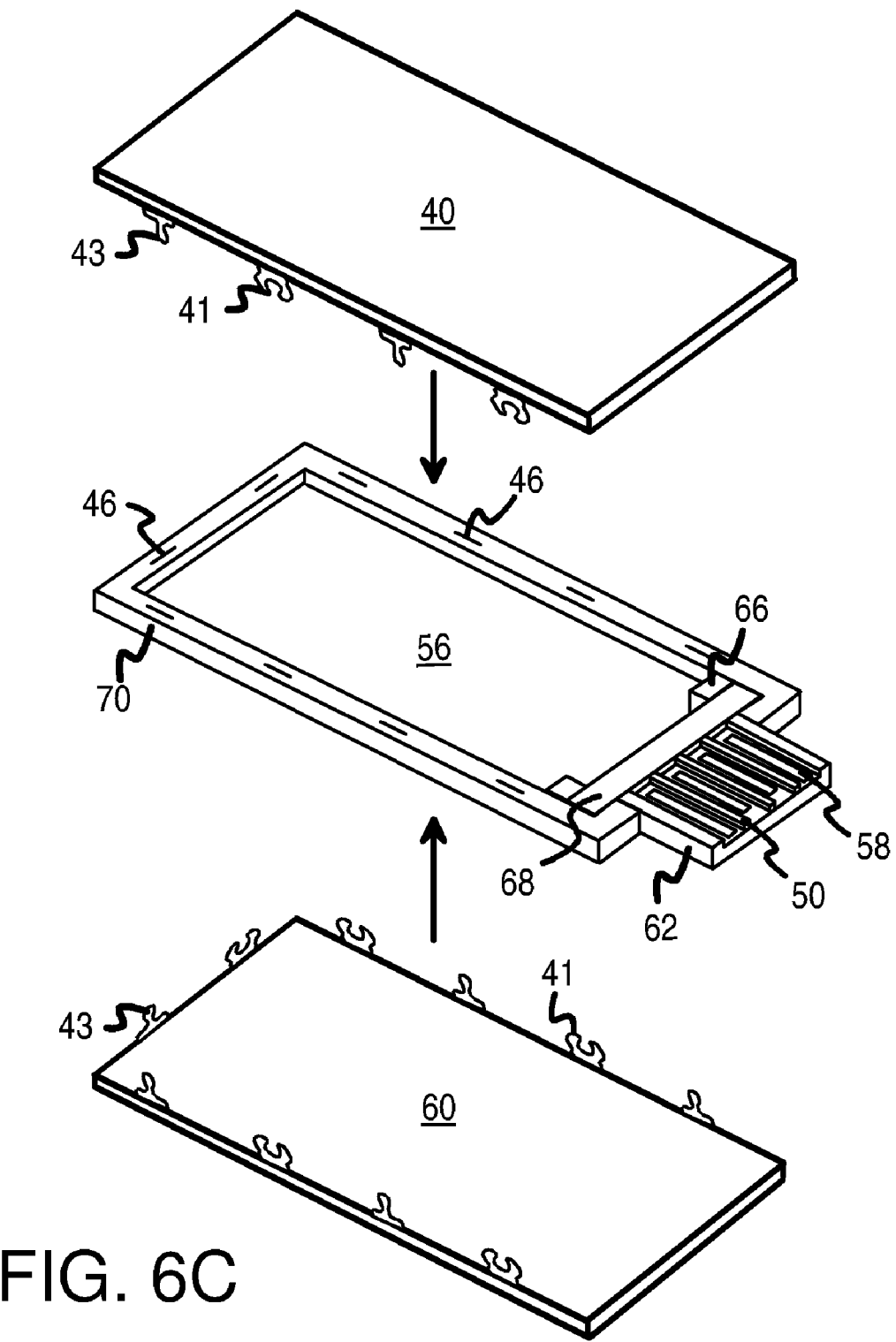

FIGS. 6A–C show assembly of a USB flash-memory drive with a USB connector attached to the PCB before assembly to a C-shaped frame. In FIG. 6A, board 56 has IC chips (not visible) mounted on the underside. USB connector plug 62 is attached to an end of board 56, such as by soldering leads (not shown) from USB connector plug 62 to board 56.

USB connector plug 62 has four metal contacts 58 that carry the USB differential data, power and ground signals. Dividers 50 can be formed on USB connector plug 62 between metal contacts 58 to aid stability.

Frame closure bar 68 is formed on the end of USB connector plug 62 where USB connector plug 62 attaches to board 56. Frame closure bar 68 is sized to fit in closure fittings 66 in C-shaped perimeter frame 70

USB connector plug 62 is soldered to board 56, then the assembly of board 56 and USB connector plug 62 is lowered into C-shaped perimeter frame 70, with frame closure bar 68 being forced between closure fittings 66. Frame closure bar 68 can fit snugly into closure fittings 66.

FIG. 6B is an enlargement of USB connector plug 62. Frame closure bar 68 can be formed from the same molding as USB connector plug 62, or could be attached. Four metal contacts 58 are formed between dividers 50 and the side ends of USB connector plug 62, and electrically connect to soldering leads (not shown) on the back of USB connector plug 62 that are soldered to signal traces on board 56.

USB connector plug 62 has a width that approximately matches the width of the connector substrate in a male USB connector. Metal contacts 58 are formed in depressions on USB connector plug 62 to act as the USB metal contacts of a male slim USB connector. The end of USB connector plug 62 is inserted into the female USB connector, such as on a PC.

FIG. 6C shows fitting covers over the assembly of the PCB and the USB connector plug. Frame closure bar 68 is fitted snugly into closure fittings 66 of C-shaped perimeter frame 70. The frictional forces hold USB connector plug 62 and board 56 inside C-shaped perimeter frame 70.

Upper cover 40 can be snapped onto the top of C-shaped perimeter frame 70, and lower cover 60 can be snapped onto the bottom of C-shaped perimeter frame 70. Snaps such as male snap 43 or female snap 41 can be formed along the perimeter of upper cover 40 and lower cover 60, and fit into snap slots 46 on C-shaped perimeter frame 70. A variety of kinds of snaps may be used.

The height of the assembled USB drive can be approximately 2.2 mm, compared to prior-art USB drives which have heights of as much as 8.0 mm. If a thicker USB device with a thicker C-shaped perimeter frame 70 was desired, IC chips could be mounted on both sides of board 56.

Figure 7A:
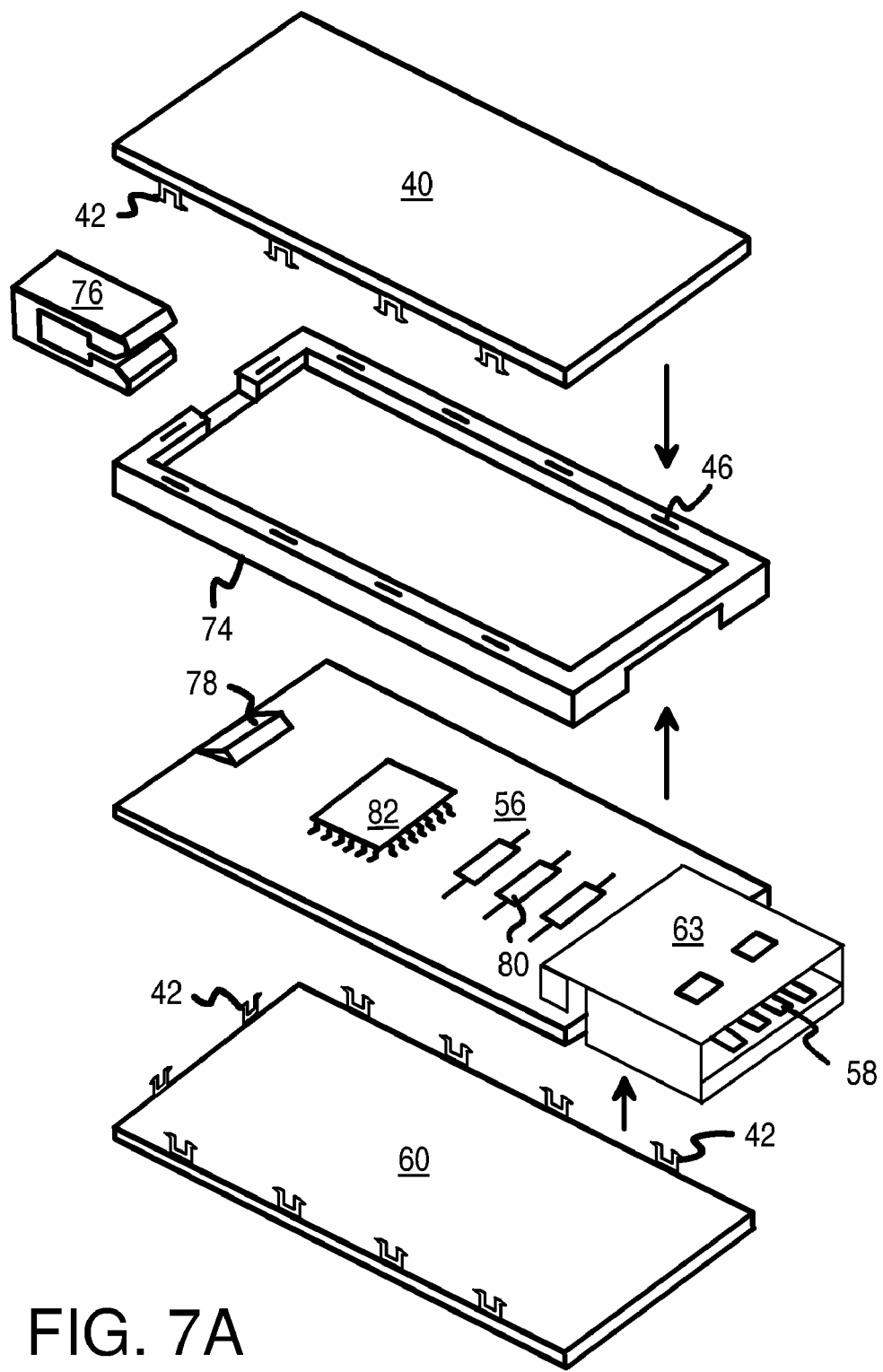
FIGS. 7A–D show assembly of a framed USB flash-memory drive with IC chips on both sides of the PCB.
Figure 7B:
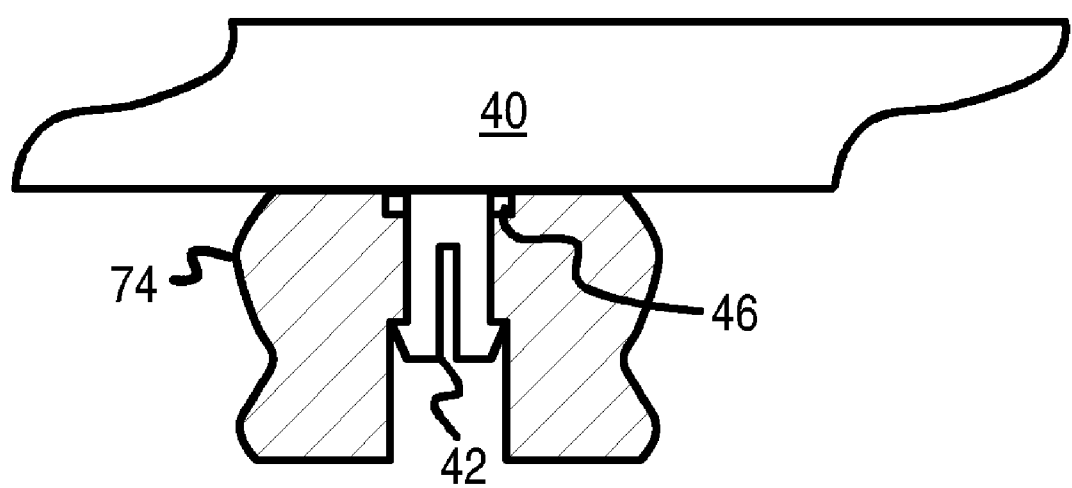
Figure 7C:
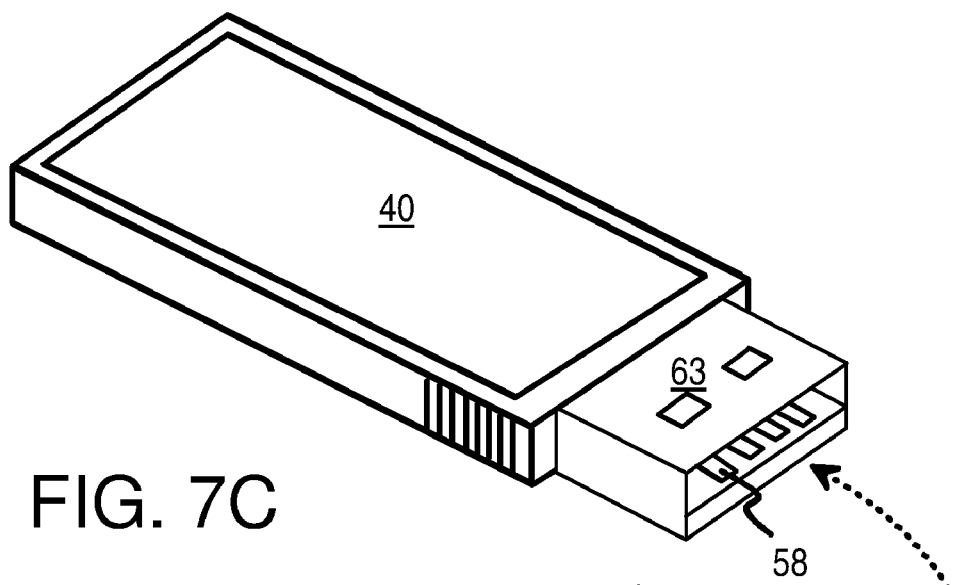

FIGS. 7A–C show assembly of a framed USB flash-memory drive with IC chips on both sides of the PCB. IC chips 82 and components 80 are mounted to the top side of board 56. Other IC chips and components (not shown) are mounted to the back side of board 56. Full USB connector plug 63 is mounted to one end of board 56, such as by soldering leads from Full USB connector plug 63 to metal traces on board 56. Full USB connector plug 63 has the full metal wrap or shell, rather than being a slim or half-height USB connector. Metal contacts 58 are mounted on a substrate within Full USB connector plug 63 that is surrounded by the metal wrap.

The centerline of Full USB connector plug 63 is one approximately the same level as the center of board 56, so that Full USB connector plug 63 straddles the edge of board 56, rather than be on one side or the other of board 56. This centerline placement provides for a more balanced USB drive.

Perimeter frame 74 has a cutout that fits around Full USB connector plug 63, so that board 56 with Full USB connector plug 63 attached can be lowered into position in the center opening of perimeter frame 74. Another notch on the back of perimeter frame 74 is located near LED 78 on board 56, and allows lightpipe 76 to be clipped on to frame 74 during assembly.

Light-emitting diode LED 78 is also mounted on board 56. LED 78 is lit or blinked to indicate to a user when data transfers are occurring on board 56, or at other times.

After lightpipe 76 is clipped onto perimeter frame 74, which surrounds board 56 with Full USB connector plug 63 attached, metal covers can be attached.

Upper cover 40 can be snapped onto the top of perimeter frame 74, and lower cover 60 can be snapped onto the bottom of perimeter frame 74. Snaps such as male snap 42 can be formed along the perimeter of upper cover 40 and lower cover 60, and fit into snap slots 46 on perimeter frame 74. A variety of kinds of snaps may be used.

FIG. 7B shows a cross-section of a snap in a snap slot. Snap slot 46 is a hole formed in perimeter frame 74. When upper cover 40 is lowered into placed, male snap 42 is inserted into snap slot 46. When fully inserted as shown, the flared ends of male snap 42 spring out where snap slot 46 widens. Thus male snap 42 is locked into place inside snap slot 46, keeping upper cover 40 locked onto perimeter frame 74.

In FIG. 7C, the assembled USB flash-memory drive is shown. Upper cover 40 has been snapped onto perimeter frame 74, and board 56 is hidden inside. Full USB connector plug 63 protrudes from the front of perimeter frame 74, with metal contacts 58 able to make with metal contacts on a female USB socket.

USB Cap 84 can be inserted over Full USB connector plug 63 to protect Full USB connector plug 63 when the USB flash-memory drive is being carried by a user. Ribs on the edges of Full USB connector plug 63 and perimeter frame 74 can provide a grip for the user to insert and remove USB Cap 84.

Figure 7D:
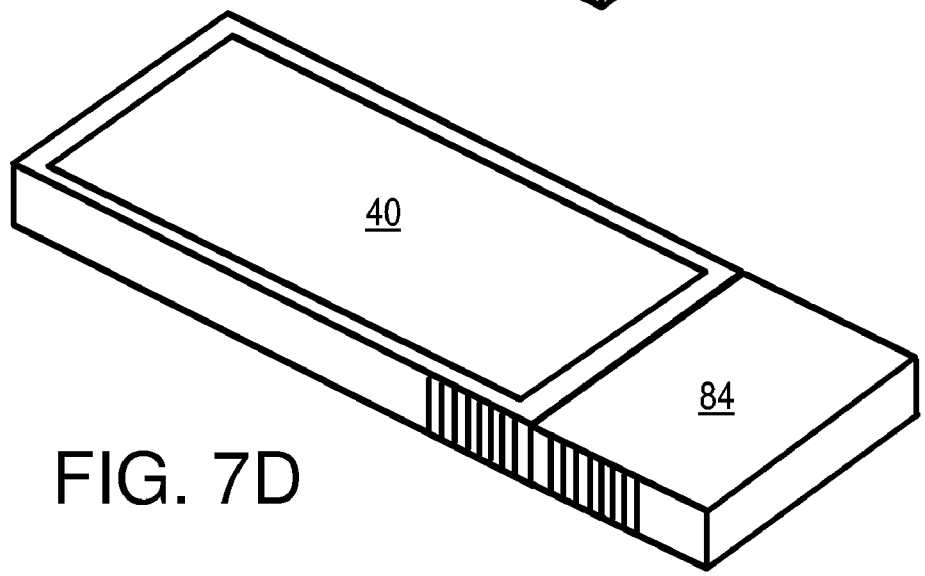

FIG. 7D shows the USB Cap on the USB flash-memory drive, protecting the Full USB connector plug.

The height of the assembled USB drive can be 4.96 mm, compared to prior-art USB drives which have heights of as much as 8.0 mm. IC chips may be mounted on both sides of board 56 since Full USB connector plug 63 is centerline-mounted to board 56. The space on both sides of board 56 is usable with the balanced centerline-plug design. A rugged design is possible due to the secure snapping of upper and lower covers onto perimeter frame 74 using male snaps 42 and snap slots 46. A passage or slot for a string or cable can be provided at the far end of perimeter frame 74 to allow for tying the flash drive to a key-chain, string, or cable for carrying by a user.

Figure 8:
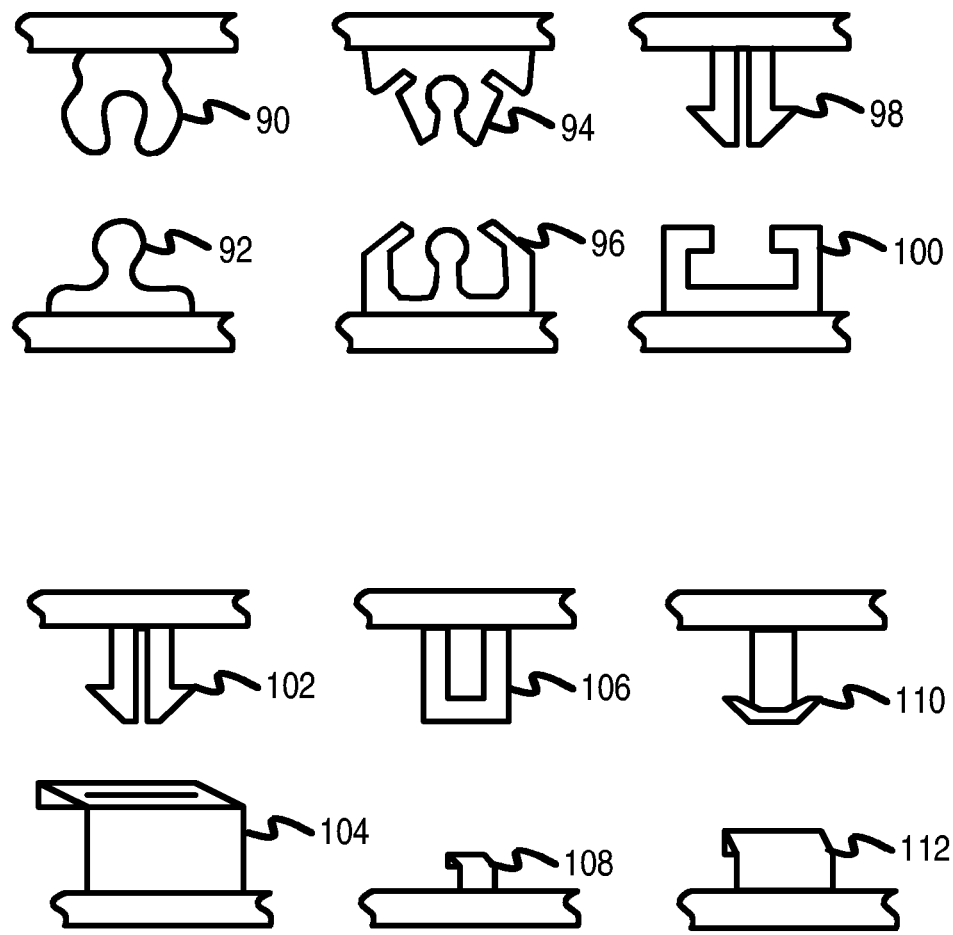
FIG. 8 shows various kinds of male and female snaps.
Figure 9:
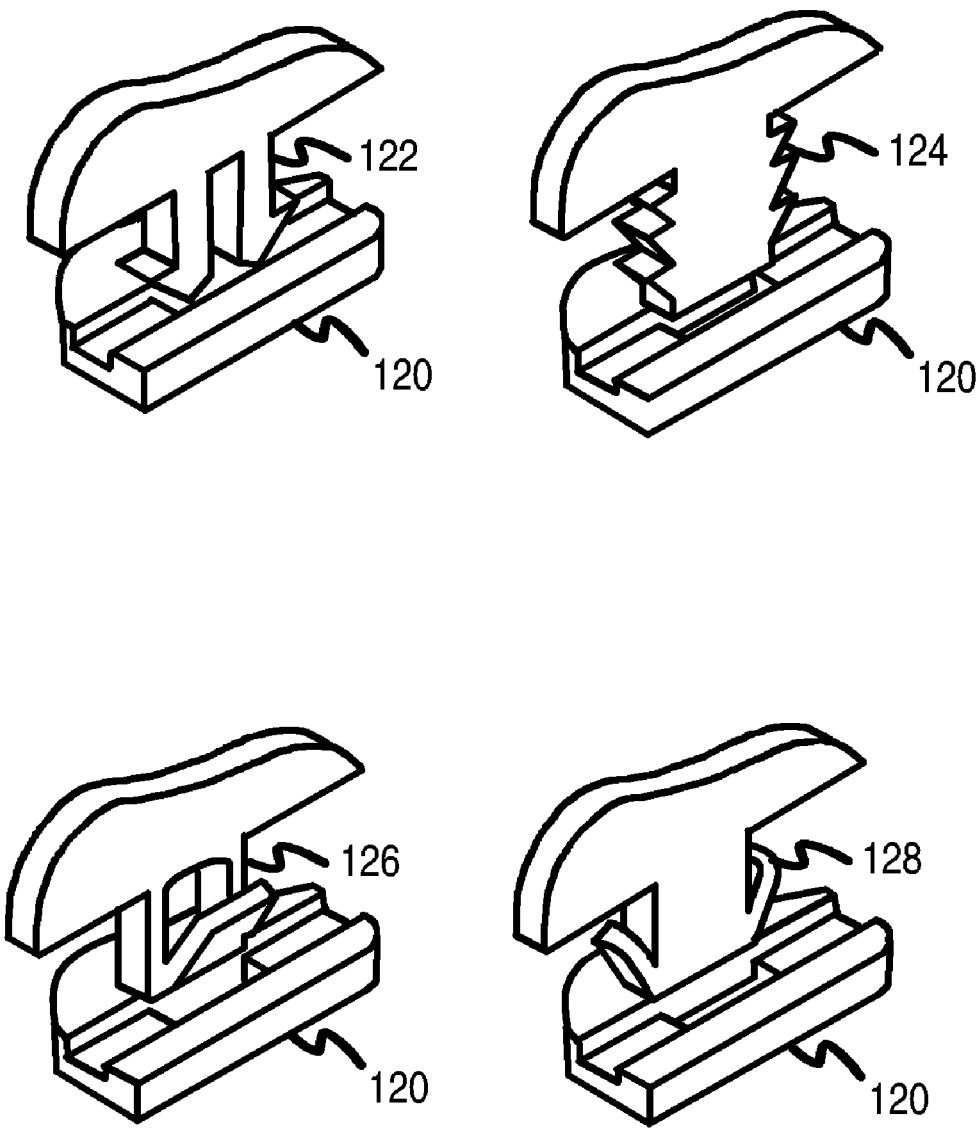
FIG. 9 shows additional kinds of snaps that fit in snap slots.

Variations of Cover Snaps—FIGS. 8, 9

FIG. 8 shows various kinds of male and female snaps. Rather than have snap slots 46 on perimeter frame 44, perimeter frame 74, or C-shaped perimeter frame 70, female snaps may be attached to or formed on the perimeter frames. Alternately, the female snaps may be attached to upper and lower covers 40, 60, while the male snaps are attached to or formed on the perimeter frames. Snaps may be attachments or may be integral with covers or frames.

Six different combinations of male and female snaps are shown in FIG. 8. Male snap 92 has a circular snap that fits into a circular opening female snap 90. An insertion force is required, which prevents the snaps from accidentally disconnecting once properly snapped together.

Additional side snap bars are provided on each side of the main circular snap in male snap 96. The two side snap bars clip into openings in female snap 94. Thus three locking mechanisms are provided, increasing the snap's locking ability.

Angled male snap 98 has two slanted extensions that are forced together when first inserted into snap slot 100. Once fully inserted, these slanted extensions snap outward and lock inside snap slot 100. Snap slot 100 could be a cross-sectional slot shape or a female snap.

Snap slot 104 is a variation that could be made from bent metal, with a slot opening that male snap 102 fits into and locks against. A smaller bent piece of metal forms snap 108, which fits inside the loop of snap 106. Still another variation is the bent metal snap 112, which engages a flare on male snap 110.

FIG. 9 shows additional kinds of snaps that fit in snap slots. Snap slots 120 may be formed during molding of the frame or may be cut into the covers. Male snaps may likewise be attached to the covers or frames, or may be integral. Male snap 122 has two extensions with slanted or angled ends. The extensions are compressed or forced together by the restricted opening of snap slot 120 when initially inserted. After the slanted portion passes the opening of snap slot 120 and reaches a larger opening within snap slot 120, the extensions can expand again, snapping male snap 122 securely into snap slot 120.

Male snap 124 has a series of angled steps on its sides that must be compressed during insertion. The plastic or metal itself of male snap 124 or snap slot 120 can be compressed during insertion. The series of angled steps allows for partial insertion of some snaps, such as when only one or two of the angled steps are fully inserted past the opening of snap slot 120.

Male snap 126 has a V-shaped extension that is compressed inward during insertion into snap slot 120. Once fully inserted, this V-shaped extension snaps back to lock the snaps together.

Male snap 128 has two V-shaped extensions on its sides that are compressed inward during insertion into snap slot 120. Once fully inserted, these V-shaped extensions snaps back to lock the snaps together.

Alternate Embodiments

Several other embodiments are contemplated by the inventors. For example a combination of the methods may be used, such as using adhesive for mounting the PCB but ultrasound or snaps for connecting the plastic covers together. For the snap-together method, instead of using simple protrusion snap tabs and grooves, a combination of matching male and female fingers can be substituted. Snap-tabs with movable latching teeth or extensions or locking portions may also be used. Different thicknesses and dimensions can be substituted for the examples given. In some embodiments the upper cover could be smaller than the lower cover, or vice-versa.

PCB fingers 61 could all have the same length, or the middle PCB fingers 61 could be shorter than the end PCB fingers 61. PCB fingers 61 could be merged so that there are only 3 or 2 fingers, or could be merged into one finger or extension that has all 4 USB metal contacts on it. Dividers 50 and the ends of frame extension 72 could be co-planar, or could have different heights, such as dividers 50 being lower than the ends. The end rails may be taller than the dividers or may be the same height as the dividers.

Caps for the USB connector plug can be added to the other embodiments, such as those for FIGS. 5, 6, or can be deleted from the embodiment of FIG. 7. Ribs or other features may be added to the perimeter frame to allow for better gripping by the user. Internal ribs could be added for increased strength or shock absorption.

Upper and lower covers may have an electrically-insulating backing layer, either directly applied to the covers, or added just before the covers are attached. The insulating layers can prevent unnecessary contact between the covers and traces or component on board 56. This is especially useful for metal covers, while plastic covers may not need such insulating layers.

Directional terms such as upper, lower, up, down, top, bottom, etc. are relative and changeable as the device is rotated, flipped over, etc. These terms are useful for describing the device but are not intended to be absolutes. Some embodiments may have chips or other components mounted on only one side of the circuit board, while other embodiments may have components mounted on both sides.

The LED can be mounted on board 56, such as on the bottom side with other components, or can extend from an edge of board 56. A region of reduced thickness may be formed in the frame to create a light window, rather than use a lightpipe. The light window could be formed on the back wall of perimeter frame 44, or could be formed on the larger bottom surface of upper cover 40 or lower cover 60. Light from the LED can partially pass through the thinner plastic of a light window, allowing the user to see a visible indicator of activity. A light guide or pipe could also be used to channel the light path to the light window.

Snap tabs can be semi-flexible plastic extensions or protrusion tabs formed on the outer edges of covers or frames and extend outward or inward. The peripheral outline of upper cover 40 and lower cover 60 may be somewhat smaller than perimeter frame 44 so that the covers can fit inside the frame.

Rather than use snap tabs for assembly, raised ridges for ultrasonic bonding may be used, or an adhesive can be used, or some combination. Pressure or heat sensitive adhesive films can be attached to upper cover 60 and to upper cover 40 where bonding is desired. For example, an adhesive could be brushed on as a liquid or paste, or it could be a double-coated adhesive film such as 3M's 7953 film. A thermal bond film (TBF) such as 3M's TBF-668 could also be used. The adhesive can be cured by heating the assembly, by pressing the covers together, or by allowing sufficient time for curing.

Rather than mount packaged IC's onto one or more sides of board 56, unpackaged die may be mounted using die-bonding techniques. Using unpackaged die rather than packaged die may reduce the size and weight of the card. The edges of board 56 could be straight or could be rounded or have some other shape.

Supporting underside ribs or bumps may be added to the underside of frame extension 72 or USB connector plug 62 to better match the USB plug thickness. When the supporting ribs are not used, the locking depressions of the parent patent could be used or could be omitted.

A variety of materials may be used for the USB connector substrate, circuit boards, metal contacts, frames, metal covers, etc. Plastic covers and frames can have a variety of shapes and may partially or fully cover different parts of the circuit board and connector, and can form part of the connector itself. Various features can have a variety of shapes and sizes. Oval, round, square, rectangular, trapezoidal, and other shapes may be used.

The slim USB connector may be considered "half-height", since it fits on one side of the female's connector substrate but not on the other side of the female's connector substrate. The actual "half-height" connector may not be exactly half the height of a standard connector, but is considered "half-height" because it engages only half of the female connector. The slim connector may be a reduction in height of only 30–40% rather than exactly half.

The slim connector may be widened to accommodate extra metal contacts to become an extended-USB connector for future USB specification. Moreover, the width of the slim connector can be widened, and the height and metal contacts of the slim connector can be varied, making it into a general-purpose slim connector, for USB, extended-USB, PCI Express, mini PCI Express applications, etc.

Other applications besides flash drives include other portable USB devices that connect to desktop computers, notebook computers, PDA's, digital cameras, cellular phones or handsets, TV set-top boxes, MP3, MPEG4, copiers, printers, and other electronic devices. Such devices may use to advantage the slim-ness of the new male and/or female USB connectors, and may reduce size and space together with lower cost. A USB flash drive with the new slim male connector can still be directly inserted into a host PC with a legacy female USB connector.

There are 4 pins in the current USB pin out definition—VCC, GND, D+, and D−. VCC is the 5V power pin. GND is the ground pin and D+ and D− are the differential data I/O pins. For the USB 2.0 specification, data transfer rates are up to 480M bits/sec, and the power supply current is 500 mA. These might not meet future (or even some current) needs of speed and power associated with some USB devices, such as large flash memory cards.

Additional metal contacts can be added to the new connectors. These additional metal contacts can serve as power, ground, and/or I/O pins which are extensions to the USB specification, or as PCI Express (or mini PCI Express) specifications. Greater power capability can be obtained with (or without) additional power and ground pins (or by a higher power supply current of the existing power pin). Multiple power supplies can also be provided by the additional power and ground pins. The improved power supply capabilities allow more devices and/or more memory chips to be powered. Extra I/O pins can be added for higher bandwidth and data transfer speeds. The additional I/O pins can be used for multiple-bit data I/O communications, such as 2, 4, 8, 12, 16, 32, 64, . . . bits. By adopting some or all of these new features, performance of flash memory cards/devices can be significantly improved. These additional pins could be located behind or adjacent to the existing USB pins, or in various other arrangements. The additional pins could be applied to male and female connectors, both the current or the new slim connectors. New types of flash memory cards/devices can be made with these new connectors, which have the additional pins.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A framed card with an integrated Universal-Serial-Bus (USB) connector comprising:

a circuit board having a top surface and a bottom surface substantially parallel to the top surface, the circuit board having edges around a perimeter of the top and bottom surfaces, the circuit board having wiring traces;

an integrated circuit mounted on the bottom surface of the circuit board;

a perimeter frame shaped to surround the circuit board on at least three of the edges of the circuit board, the perimeter frame having a height that is greater than a thickness of the circuit board between the top and bottom surfaces, the perimeter frame having a central opening approximately matching a shape of the bottom surface of the circuit board so that the circuit board can be inserted within the perimeter frame during assembly;

an upper cover, attachable to the perimeter frame during assembly, for covering the central opening of the perimeter frame to encapsulate the top surface of the circuit board when assembled;

a lower cover, attachable to the perimeter frame during assembly, for covering the central opening of the perimeter frame to encapsulate the bottom surface of the circuit board when assembled; and a USB connector, extending from the perimeter frame and electrically connected to the circuit board, having USB metal contacts for mating with corresponding USB metal contacts in a USB socket when the USB connector is inserted into the USB socket the USB connector being attached to the circuit board so that the USB metal contacts are electrically connected to the integrated circuit on the circuit board through the wiring traces on the circuit board;

a plurality of dividers, substantially parallel to the USB metal contacts and formed between the USB metal contacts, each divider disposed between an adjacent pair of the USB metal contacts, the plurality of dividers rising above a level of the USB metal contacts when assembled;

wherein the plurality of dividers are for filling in a gap between the USB connector and the USB socket when the USB connector is inserted into the USB socket, whereby the circuit board is encapsulated on the edges by the perimeter frame and is encapsulated on a top by the upper cover and on a bottom by the lower cover that attach to the perimeter frame.

2. The framed card of claim 1 further comprising:
a light-emitting diode LED mounted to the circuit board near an edge opposite the USB connector when assembled; and
a lightpipe that fits on the perimeter frame near the LED when assembled.

3. The framed card of claim 1 further comprising:
electrical components mounted to the top surface of the circuit board; and
electrical components mounted to the bottom surface of the circuit board,
whereby electrical components are mounted to both top and bottom surfaces of the circuit board.

4. The framed card of claim 1 further comprising:
an end cap for fitting over the USB connector when not connected to the USB socket, for protecting the USB connector from damage.

5. The framed card of claim 1 further comprising:
snap tabs near a perimeter of the upper cover and the lower cover;
snap slots on the perimeter frame for receiving the snap tabs when the upper cover and the lower cover are assembled to the perimeter frame;
wherein the snap tabs lock into the snap slots during assembly to secure the upper cover and the lower cover to the perimeter frame.

6. The framed card of claim 5 wherein the snap tabs further comprise:
flexible extensions that are distorted during insertion of the snap tabs into the snap slots, the flexible extensions releasing to lock when the snap tabs are fully inserted into the snap slots.

7. The framed card of claim 1 wherein the perimeter frame forms a closed loop that completely surrounds the central opening.

8. The framed card of claim 7 wherein the USB connector comprises:
a frame extension of the perimeter frame, the frame extension extending outward, in a direction away from the central opening;
a plurality of frame slots in the perimeter frame, the plurality of frame slots between the central opening and the frame extension; and
a plurality of board fingers that extend from the circuit board, the plurality of board fingers fitting through the plurality of frame slots during assembly so that the plurality of board fingers are situated in the frame extension after assembly;
wherein the USB metal contacts are formed on the plurality of board fingers.

9. The framed card of claim 7 wherein the USB connector comprises:
a plug substrate that supports the USB metal contacts;
a metal wrap that wraps around the plug substrate and the USB socket when the USB connector is inserted into the USB socket; and
soldering leads, electrically connected to the USB metal contacts on the plug substrate, the soldering leads for soldering to traces on the top surface of the circuit board.

10. The framed card of claim 9 wherein the USB connector is a slim USB connector or a full-sized USB connector.

11. The framed card of claim 7 wherein the perimeter frame forms an open loop that partially but not completely surrounds the central opening.

12. The framed card of claim 11 wherein the perimeter frame is a C-shaped frame.

13. The framed card of claim 12 wherein the USB connector comprises:
a slim USB connector plug having the USB metal contacts;
a frame closure bar disposed between the slim USB connector plug and the circuit board when assembled; and
soldering leads, electrically connected to the USB metal contacts on the slim USB connector plug, the soldering leads for soldering to traces on the top surface of the circuit board.

14. The framed card of claim 13 further comprising:
closure fittings on the perimeter frame near open ends of the open loop, the closure fittings for mating with the frame closure bar when the circuit board and the USB connector are assembled to the perimeter frame;
wherein the closure fittings and the frame closure bar form a closed loop that completely surrounds the central opening when assembled.

15. A portable Universal-Serial-Bus (USB) framed assembly comprising:
a circuit board having wiring traces and electronic components mounted thereon, the circuit board having a contact side;
a perimeter frame that surrounds the circuit board, the perimeter frame being an open ring shape or a closed ring shape;
an upper cover for substantially covering the contact side of the circuit board when assembled to the perimeter frame;
a lower cover for substantially covering a reverse side opposite the contact side of the circuit board when assembled to the perimeter frame;

a USB connector mounted to an end of the circuit board, the USB connector protruding through the perimeter frame, the USB connector having a connector substrate having four metal contacts on an insertion end, the four metal contacts for connecting to USB contacts in a USB socket when inserted; and dividers between and parallel to the four metal contacts on the USB connector, the dividers rising above a level of the four metal contacts, whereby side edges the circuit board are enclosed by the perimeter frame, while the contact side of the circuit board is enclosed by the upper cover and the perimeter frame and the reverse side of the circuit board is enclosed by the lower cover and the perimeter frame.

16. The portable Universal-Serial-Bus (USB) framed assembly of claim 15 further comprising:

one or more finger extensions of the circuit board that has the four metal contacts on a contact side;

a frame slot in the perimeter frame, the frame slot sized to allow the finger extension of the circuit board to fit through to the USB connector; and a depression in the USB connector for receiving the finger extension fitted through the frame slot.

17. The portable Universal-Serial-Bus (USB) framed assembly of claim 15 further comprising:

closure fittings in the perimeter frame when the perimeter frame has the open ring shape, the closure fittings near an opening in the open ring shape; and a frame closure bar on a rear end of the USB connector opposite the insertion end, the frame closure bar fitting into the closure fittings.

18. A reduced-height Universal-Serial-Bus (USB) plug card comprising:

circuit board means for supporting integrated circuits on a bottom side, having an insertion end for insertion into a USB socket, the insertion end extending beyond a center area of the circuit board means;

metal contactor means, formed on the insertion end of a top side of the circuit board means, for making electrical contact with a USB socket when the insertion end is inserted into the USB socket;

frame means for framing the center area of the circuit board means, the frame means substantially exposing the top side and the bottom side of the circuit board means when the circuit board means is fitted inside the frame means, but the insertion end of the circuit board means extending beyond the frame means;

frame extension means, integral with and formed with the frame means, for supporting the insertion end of the circuit board means and exposing the metal contactor means;

top cover means, formed from plastic or metal, for snapping to the frame means to partially encapsulate the top side of the circuit board means;

bottom cover means, formed from plastic or metal, for snapping to the frame means to encapsulate the bottom side of the circuit board means;

divider means, formed on the frame extension means between the metal contactor means, for dividing gaps between the insertion end of the USB plug card and the USB socket when inserted; and end means, on the frame extension means, for extending side edges of the frame extension means to fill in gaps to sides of the USB socket produced by lack of a surrounding wrap surrounding the frame extension means and the insertion end;

whereby stability when inserted into the USB socket is increased by the divider means, the end means, and the frame extension means.

19. The reduced-height Universal-Serial-Bus (USB) plug card of claim 18 further comprising:

snap means for snapping and locking the top cover means to the frame means, and for snapping and locking the bottom cover means to the frame means.

* * * * *